US012265030B2

(12) United States Patent
Vaziri et al.

(10) Patent No.: US 12,265,030 B2
(45) Date of Patent: Apr. 1, 2025

(54) HYBRID MULTI-PHOTON MICROSCOPY

(71) Applicant: The Rockefeller University, New York, NY (US)

(72) Inventors: Alipasha Vaziri, New York, NY (US); Siegfried Weisenburger, New York, NY (US)

(73) Assignee: The Rockefeller University, New York, NY (US)

( * ) Notice: Subject to any disclaimer, the term of this patent is extended or adjusted under 35 U.S.C. 154(b) by 0 days.

(21) Appl. No.: 18/479,321

(22) Filed: Oct. 2, 2023

(65) Prior Publication Data

US 2024/0159674 A1 May 16, 2024

Related U.S. Application Data

(63) Continuation of application No. 17/427,586, filed as application No. PCT/US2020/015825 on Jan. 30, 2020, now Pat. No. 11,808,702.

(60) Provisional application No. 62/799,408, filed on Jan. 31, 2019.

(51) Int. Cl.
  *G01N 21/64* (2006.01)
  *G02B 21/16* (2006.01)
(52) U.S. Cl.
  CPC ..... *G01N 21/6428* (2013.01); *G01N 21/6458* (2013.01); *G02B 21/16* (2013.01); *G01N 2201/06113* (2013.01)
(58) Field of Classification Search
  None
  See application file for complete search history.

(56) References Cited

U.S. PATENT DOCUMENTS

| | | | | |
|---|---|---|---|---|
| 5,034,613 A | * | 7/1991 | Denk | G11B 7/12 250/462.1 |
| 8,208,504 B2 | * | 6/2012 | Dantus | H01S 3/0057 250/281 |
| 8,208,505 B2 | * | 6/2012 | Dantus | G01B 9/02014 250/281 |
| 8,451,452 B2 | * | 5/2013 | Podoleanu | G01B 9/0209 356/497 |

(Continued)

*Primary Examiner* — David P Porta
*Assistant Examiner* — Djura Malevic
(74) *Attorney, Agent, or Firm* — NovoTechIP International PLLC

(57) ABSTRACT

A multi-photon imaging system includes a laser module having a first channel for outputting a two-photon excitation laser pulse and a second channel for outputting a three-photon excitation laser pulse. The system further includes a first optical path for guiding the two-photon laser pulse from the first channel of the laser module and a second optical path for guiding the three-photon laser pulse from the second channel of the laser module. A microscope is also provided for simultaneously receiving the two-photon laser pulse from the first optical path and the three-photon laser pulse from the second optical path, and simultaneously, or with well controllable delays, delivering the two-photon laser pulse and the three-photon pulse to a target volume. The system further includes a photodetector configured to collect photons generated within the target volume in response to simultaneous excitation of the target volume by both the two-photon laser pulse and the three-photon laser pulse.

20 Claims, 4 Drawing Sheets

(56) References Cited

U.S. PATENT DOCUMENTS

| | | | |
|---|---|---|---|
| 8,675,699 B2* | 3/2014 | Dantus | G01J 11/00 |
| | | | 372/25 |
| 8,861,075 B2* | 10/2014 | Dantus | H01S 3/005 |
| | | | 372/25 |
| 9,018,562 B2* | 4/2015 | Dantus | B23K 26/382 |
| | | | 219/121.76 |
| 9,939,381 B1* | 4/2018 | Kimmel | G01N 21/6458 |
| 11,599,994 B2* | 3/2023 | Cui | G02B 21/0036 |
| 2006/0056468 A1* | 3/2006 | Dantus | G01B 9/02014 |
| | | | 372/28 |
| 2006/0187974 A1* | 8/2006 | Dantus | H01S 3/0057 |
| | | | 372/9 |
| 2011/0134436 A1* | 6/2011 | Podoleanu | G01B 9/02004 |
| | | | 356/512 |
| 2016/0238532 A1* | 8/2016 | Freudiger | G02B 21/16 |
| 2017/0102532 A1* | 4/2017 | Frankel | G02B 21/0032 |
| 2022/0120686 A1* | 4/2022 | Vaziri | G02B 21/0084 |
| 2024/0255424 A1* | 8/2024 | Tehrani | H03L 7/08 |

* cited by examiner

HYBRID MULTI-PHOTON MICROSCOPY

CROSS-REFERENCE TO RELATED APPLICATIONS

This application is a continuation of U.S. Ser. No. 17/427,586, filed Jul. 30, 2021, which claims priority from U.S. Provisional Application Ser. No. 62/799,408, filed on Jan. 31, 2019, and PCT Application Serial No. PCT/US2020/015825, filed Jan. 30, 2020, the specifications of which are incorporated herein in their entirety for all purposes.

BACKGROUND

A major goal of modern neuroscience is to understand how neural networks perform cognitively relevant functions. In order to achieve this goal, it is useful to simultaneously and independently record activities of large neuronal populations that are building blocks of even the simplest neural networks. This task has been hampered, however, by shortcomings in available tools and technologies.

Information related to sensory inputs, behavioral states, and cognitive functions are all thought to be represented on multiple spatial and temporal scales in a distributed fashion and over large neuronal networks that can span up to the level of entire brains. The ability to capture the dynamics of such large neuronal ensembles across multiple regions of the brain at sufficient spatial and temporal resolution is thus essential in order to understand how various cognitive functions and complex behavior emerge from the activity of neuronal populations.

Over the last two decades, innovations in optical microscopy have facilitated major discoveries in neuroscience by enabling the recording of neuronal activity at higher speed, spatial resolution, across depth and of ever larger populations. In particular, two-photon (2p) scanning microscopy, together with genetically encodable calcium ($Ca^{2+}$) indicators, has emerged as the standard imaging modality for in vivo recording of neuronal activity in scattering brain tissues. However, sequential point-by-point scanning of a diffraction-limited 2p excitation spot is slow and severely limits the image acquisition rate and the size of 3-dimensional (3D) volumes that can be imaged at biologically relevant time scales.

To address this pervasive problem, different microscopy schemes have been developed which are aimed at improving the recording speed or the attainable imaging volume using a variety of technical approaches. Despite these advances in technology, it remains challenging to record volumetric activity in an unbiased fashion from large neuronal populations located at depth in scattering tissues at single-cell resolution and on physiological timescales.

Accordingly, it would be desirable to provide a new, modular microscopy platform that features an integrated systems-wide design approach and utilizes a hybrid two-photon (2p)-three-photon (3p) excitation scheme in combination with a series of technical innovations including spatiotemporal multiplexing, one-pulse-per voxel excitation and synchronized detection, rapid remote scanning, and light sculpting using temporal focusing.

SUMMARY

In one aspect of the present invention, an integrated systems-wide optimization approach is provided in combination with multiple technical innovations, wherein a new design paradigm for optical microscopy that is based on maximization of biological information content as measured by the fidelity of obtained neuronal signals is presented. A modular design utilizes a hybrid multi-photon acquisition approach and allows volumetric recording of neuroactivity at single-cell resolution within volumes of up to 1,000×1,000×1,220 µm at up to 17 Hz in awake behaving mice.

A multi-photon imaging system according to one aspect of the present invention includes a laser module having a first channel for outputting a two-photon excitation laser pulse and a second channel for outputting a three-photon excitation laser pulse. The system further includes a first optical path for guiding the two-photon laser pulse from the first channel of the laser module and a second optical path for guiding the three-photon laser pulse from the second channel of the laser module. A microscope is also provided for simultaneously receiving the two-photon laser pulse from the first optical path and the three-photon laser pulse from the second optical path, and simultaneously, or with well controllable delays, delivering the two-photon laser pulse and the three-photon pulse to a target volume. The system further includes a photodetector configured to collect photons generated within the target volume in response to simultaneous excitation of the target volume by both the two-photon laser pulse and the three-photon laser pulse.

In another aspect of the present invention, the first optical path includes a multiplexing module configured to split the two-photon excitation laser pulse received from the laser module into a plurality of sub-pulses including a first sub-pulse and a second sub-pulse. The multiplexing module is further configured to introduce a time delay between the first sub-pulse and the second sub-pulse.

The first optical path may also include a temporal focusing module having an optical grating for spatially dispersing the spectrum of at least one of the two-photon excitation laser pulse or the three-photon excitation laser pulse.

The first optical path may also include a remote scanning module having a mirror movable in an axial direction of the first optical path for axially scanning the two-photon excitation laser pulse between different depths within the target volume. The second optical path may also include a remote scanning module including a minor movable in an axial direction of the second optical path for axially scanning the three-photon excitation laser pulse between different depths within the target volume.

In another aspect of the invention, the system may further include an actuator for moving the microscope in a direction of the received two-photon laser pulse and the received three-photon laser pulse for axially scanning the two-photon laser pulse and the three-photon laser pulse between different depths within the target volume.

Both the first optical path and the second optical path may include a two-dimensional lateral scanning module for respectively angularly deflecting the two-photon laser pulse and the three-photon laser pulse, whereby the two-photon laser pulse and the three-photon laser pulse are respectively scanned on first and second axial planes within the target volume.

An imaging system according to another aspect of the present invention may include a laser module for outputting a laser pulse, a multiplexing module configured to split the laser pulse received from the laser module into a plurality of sub-pulses including a first sub-pulse and a second sub-pulse and to introduce a time delay between the first sub-pulse and the second sub-pulse, a temporal focusing module including an optical grating for spatially dispersing the spectrum of the first sub-pulse and the second sub-pulse, a remote scanning module for receiving the first sub-pulse and the second sub-pulse and including a minor movable in an axial direction of the first sub-pulse and the second sub-pulse for axially scanning the first sub-pulse and the second sub-pulse between different depths within the target volume, a telescope for receiving the first sub-pulse and the second sub-pulse from the remote scanning module and delivering the first sub-pulse and the second sub-pulse to a target volume and a photodetector configured to collect photons generated within the target volume in response to simultaneous excitation of the target volume by both the first sub-pulse and the second sub-pulse.

The imaging system according to this aspect of the present invention may further include a lateral scanning module for respectively angularly deflecting the first sub-pulse and the second sub-pulse, whereby the first sub-pulse and the second sub-pulse are respectively scanned on first and second axial planes within the target volume.

In yet another aspect of the present invention, a method for multi-photon imaging of fluorophores within a target volume is provided. The method includes providing a two-photon laser pulse from a laser module, providing a three-photon laser pulse from the laser module, guiding the two-photon laser pulse from the laser module along a first optical path, guiding the three-photon laser pulse from the laser module along a second optical path, simultaneously delivering the two-photon laser pulse from the first optical path and the three-photon laser pulse from the second optical path to a microscope, simultaneously delivering the two-photon laser pulse and the three-photon pulse from the telescope to a target volume and simultaneously collecting photons generated within the target volume in response to simultaneous excitation of the target volume by both the two-photon laser pulse and the three-photon laser pulse with a photodetector.

The method may further include splitting the two-photon pulse into a plurality of sub-pulses including at least a first sub-pulse and a second sub-pulse and introducing a time delay between the first sub-pulse entering the target volume and the second sub-pulse entering the target volume.

The method may further include spatially dispersing the spectrum of the two-photon laser pulse.

The method may further include axially scanning the two-photon laser pulse between different depths within the target volume. The method may further include simultaneously axially scanning the two-photon laser pulse and the three-photon laser pulse between different depths within the target volume.

The method may further include angularly deflecting the two-photon laser pulse and the three-photon laser pulse, whereby the two-photon laser pulse and the three-photon laser pulse are respectively scanned on first and second axial planes within the target volume.

In another aspect, a method for high-speed imaging of fluorophores within a target volume is provided, wherein the method includes providing a pulsed laser beam from a laser module, splitting the pulsed laser beam from the laser module into a plurality of sub-pulses with a multiplexing module such that the plurality of sub-pulses includes a first sub-pulse and a second sub-pulse, introducing a time delay between the first sub-pulse and the second sub-pulse, spatially dispersing the spectrum of the first sub-pulse and the second sub-pulse, axially scanning the first sub-pulse and the second sub-pulse between different depths within the target volume, delivering the first sub-pulse and the second sub-pulse to a target volume and collecting photons generated within the target volume in response to simultaneous excitation of the target volume by both the first sub-pulse and the second sub-pulse.

In this aspect, the method may further include respectively angularly deflecting the first sub-pulse and the second sub-pulse, whereby the first sub-pulse and the second sub-pulse are respectively scanned on first and second axial planes within the target volume.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
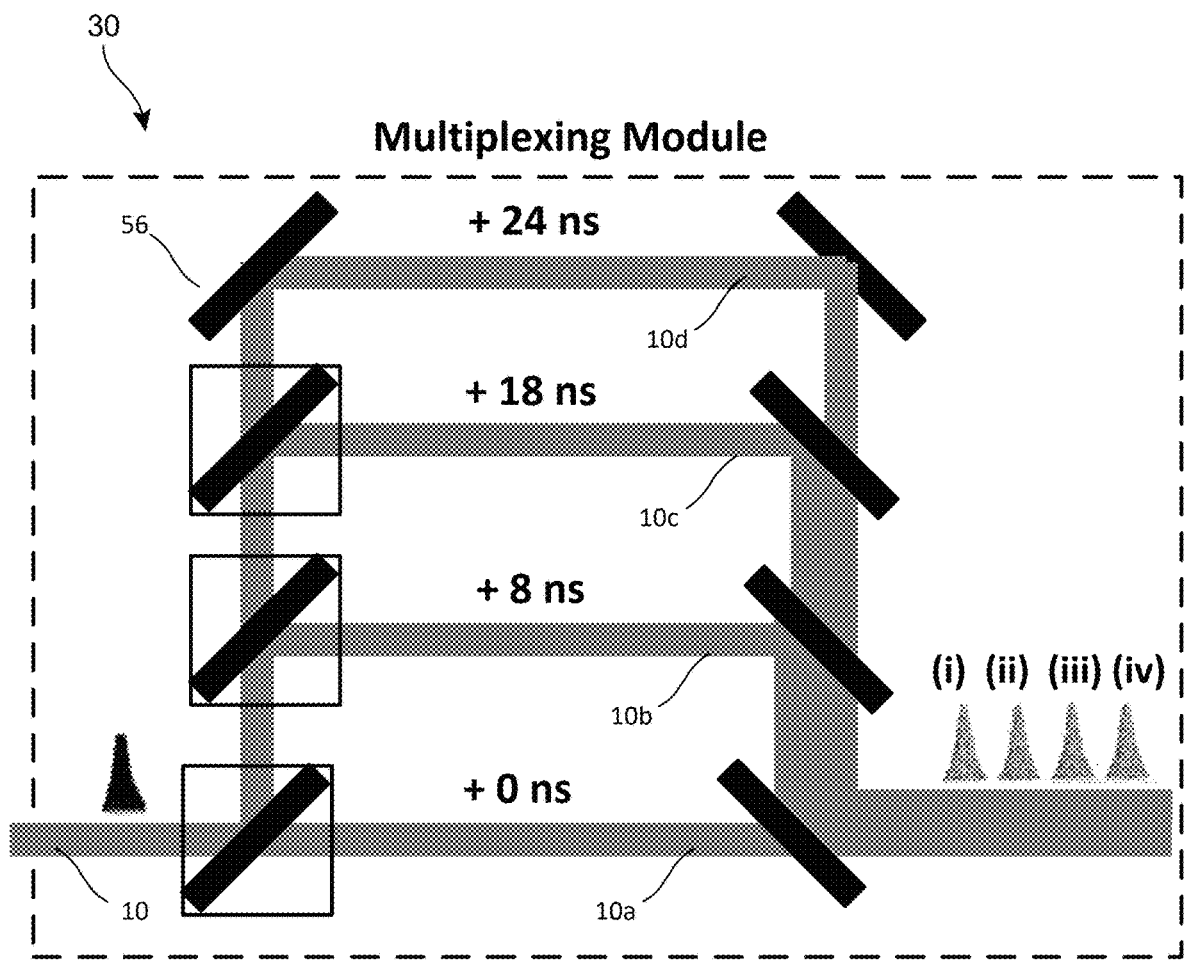
FIG. 1 is a schematic diagram of a 2p multiplexing temporal focusing (MuST) microscope with remote scanning, according to the present invention.

One of the goals of the present invention microscope design was to faithfully extract neuronal activity at the precision of single neuronal cell bodies, ~10-15 µm, from target volumes that span ~1 mm axially and ~1 mm laterally at a minimum volume rate set by the time scale of typical $Ca^{2+}$ transients while maintaining the sample exposure to laser power within established safe limits. In conventional 2p laser scanning microscopy, the voxel size is on the order of the diffraction-limited point spread function (PSF) size (~0.5×0.5×2 µm³) which together with the typical sample-to-sample spacing of ~0.5 µm results in slow imaging rates when the aim is to record from a large volume. For example, a 1,000×1,000×600 µm volume would be composed of ~1.2×10⁹ voxels.

Because all these voxels need to be sequentially sampled, the volume acquisition rates using a typical 80-MHz repetition rate laser would be in the range of <0.1 Hz, even when assuming no additional limitations due to the scan hardware, thus insufficient to capture neuronal dynamics distributed across the volume. While the lateral size d of excitation in a diffraction-limited spot can resolve anatomical features that are on the order of $d\sim\lambda/(2NA)\sim0.5$ µm, a major reason for using diffraction limited scanning—even in cases such as single neuronal resolution imaging where a lower lateral resolution would be sufficient—is to obtain optical sectioning in scattering tissue.

The localization of a Gaussian beam along the axial direction z is proportional to $\sim d^2$, thus larger, and intrinsically coupled to the lateral localization of excitation. Therefore, by decoupling the lateral from the axial confinement of excitation, one could in principle generate a laterally larger but more isotropically shaped PSF that would more adequately sample the volume along all dimensions when the ~0.5 μm lateral resolution of diffraction-limited scanning is not required.

In one aspect of the present invention, a nearly isotropically shaped 5-μm spot size is used, together with a 5-μm sampling of a target volume of ~1 mm$^3$. To achieve decoupling of the lateral from the axial confinement of excitation, light sculpting based on temporal focusing (TeFo) is utilized. In TeFo, the spectrum of an ultrafast laser is typically spatially dispersed by a grating and imaged into the sample. This arrangement results in a geometric dispersion of the pulse frequency components everywhere but in one focal plane within the sample, achieving an axial confinement of the excitation that can be controlled by the spectral filling of the microscope objective back focal aperture.

The ability to record from volumes as large as 1,000×1,000×600 μm at multi-Hertz rates in an unbiased manner puts high demands on the repetition rate and pulse energy of the laser system, as the number of voxels scales with the cube of the field of view (FOV), and each voxel needs to be excited by at least one pulse and with sufficient total energy to result in adequate signal-to-noise (SNR) levels within the voxel dwell time. Assuming a voxel size of 5×5×10 μm and accounting for some time overhead due to acquisition and scan hardware, this translates to a laser system with a pulse repetition rate of >15 MHz and pulse energies of >100 nJ.

While such a laser system at the peak absorption wavelength (~960 nm) of the commonly used green $Ca^{2+}$ indicator, GCaMP, is not available, the present invention utilizes a custom laser system for this wavelength that could provide the highest possible repetition rate while maintaining a sufficient pulse energy of >100 nJ to excite larger PSFs with sufficient SNR. In one aspect, the system of the present invention consists of a fiber chirped pulse amplifier (FCPA) that pumps an optical parametric chirped pulse amplifier (OPCPA). The OPCPA has an output at λ960 nm with a repetition rate of ~4.7 MHz while providing >800 nJ, sufficient for a one-pulse-per-voxel acquisition scheme. This acquisition scheme allows for the maximization of the obtainable fluorescence signal and SNR from each voxel for the lowest possible single-photon induced heat penalty.

To record from the target volume at the required imaging rate, the present invention combines light-sculpted PSF with spatiotemporal multiplexing resulting in a Multiplexed Scanned Temporal Focusing (MuST) microscope. The excitation beam 10 is split into four beamlets 10a, 10b. 10c. 10d and sent through a delay stage that introduces a temporal delay of ~8 ns between each of the four beamlets, as shown in FIG. 1. FIG. 1 shows a multiplexing module 30 creating four beamlets using PBS (polarizing beam splitters) and HWP (half wave plates), each delayed by 8 ns, for example, with respect to the adjacent one. As a result, a repetition rate of 18.8 MHz could be effectively realized, which is well within the required range, while allowing parallel scanning of the four individual excitation spots.

The required temporal delay between the beamlets is determined by the combined effects of the fluorophore's fluorescent lifetime, which is ~2.7 ns for GCaMP $Ca^{2+}$ indicators, convolved with the instrument response function of the data acquisition driven mainly by the detector and digitization bandwidths. Using a fast (1 ns) rise time photomultiplier tube (PMT) and sampling at 750 MHz, the chosen 8-ns delay between the beamlets allows de-multiplexing of the fluorescent signals from subsequent beamlets with negligible cross-talk. Thus, this scheme allows for an effective time-tagging of the four excitation spots such that their fluorescence signals could be discriminated by a single PMT based on their different detection times.

Tissue heating due to linear absorption is the main known damage mechanism in nonlinear microscopy and it has been shown that average power levels above ~250 mW can lead to heat-induced tissue damage as reported via immunohistochemical markers. The tolerable levels of average power impose a limitation on the pulse energy at the effective repetition rate and for the larger, light-sculpted PSF, while using a single-pulse-per-voxel excitation scheme results in an $\sqrt{n}$ times SNR gain for the same average power (compared to averaging n laser pulses).

In another aspect of the present invention, a model is presented that accounts for the various system parameters such as collection efficiency or digitizer dynamic range as well as the laser spot size and shape, and the characteristics of the $Ca^{2+}$ indicators. The sensitivity, S, the true-positive rate of identifying neuronal signals against a ground truth, is used as the figure of merit in the signal extraction pipeline. While dependent on SNR—as well as the spatial resolution and acquisition rate—the sensitivity (S), is the better figure of merit, as it allows for direct optimization of the microscope based on a key performance factor that is of ultimate biological relevance. Thereby the minimally required laser pulse energy resulting in a sufficient SNR—but not necessarily the highest possible—for high-fidelity neuronal signal extraction could be identified.

A high sensitivity (S>0.9) can be achieved using a 5-μm TeFo spot and a combined pulse energy of ~10-20 nJ for all four excitation spots, corresponding to a total average power of ~50~100 mW while maintaining high fidelity in neuronal signal detection. In contrast, the diffraction-limited PSF under the same conditions only reaches a sensitivity of S~0.75 due to under-sampling.

Increasing the lateral size of the PSF requires higher pulse energies to maintain the same signal level. However, this is not the case for the axial extent of the PSF because the fluorescence signal is proportional to the photon flux through the excitation area. Thus, while from a purely spatial sampling perspective an isotropically shaped PSF would be desirable, optimization of the axial size of the PSF under maximization of S and volume acquisition speed results in a larger axial PSF size up to the limit of the cell body diameter (10~15 μm) beyond which decrease in SNR and increased crosstalk reduce. An optimum lateral 2p excitation spot size of ~5 μm and an axial size of ~10~15 μm can be used as target parameters for sculpted 2p-MuST PSF.

While the scanning hardware for in-plane imaging can easily achieve sufficient frame rates for $Ca^{2+}$ imaging using fast resonant scanners (~16 kHz bi-directional rate) and galvo scanners (>1 kHz line rate), scanning in the axial (z) direction is typically slower and more challenging. Axial scanning of the microscope objective using a piezoelectric element is inertia-limited and thus slow when using a long translation range of ~0.5~1 mm. Moreover, it could cause aberrations and vibrations that are transferred to the sample.

Figure 2:
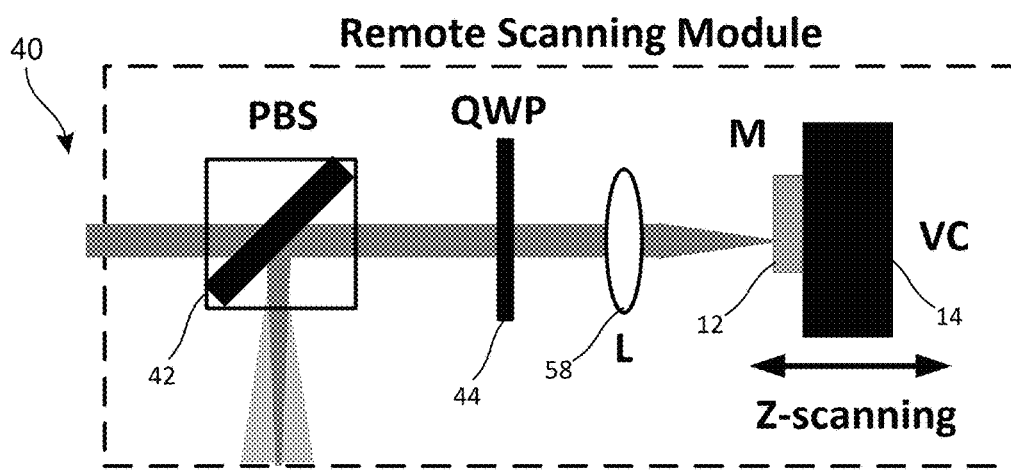
FIG. 2 is a schematic diagram of a remote scanning module, according to the present invention.

Physical movement of the objective can be avoided by using remote axial scanning, as shown in FIG. 2. FIG. 2 shows a remote scanning module 40 according to one aspect of the present invention. The remote scanning module 40 includes a polarizing beam splitter (PBS) 42, a quarter wave plate (QWP) 44 and at least one mirror (M) 12 mounted on a voice coil actuator (VC) 14 that can modulate the beam divergence for axial z-scanning. As will be discussed in further detail below, four (4) mirrors 12 are preferably mounted on the voice coil actuator 14 for respectively reflecting the four beamlets 10a, 10b. 10c. 10d received from the multiplexing module 30.

According to the present invention, TeFo is combined with remote axial scanning by inserting the axially movable mirror 12 into a plane conjugated to both the grating plane and the sample plane. Axial scanning of the minor 12 results in a modulation of the beam divergence of the reflected beam, which results in a shift of the axial position of the light-sculpted TeFo spot. Since the laser pulses are spatially dispersed before the remote scanning module, the geometric focal plane and the temporal focusing plane coincide for all remote scanning z-positions. Thus, the axial confinement characteristics of the excitation as provided by temporal focusing are not affected.

Figure 3:
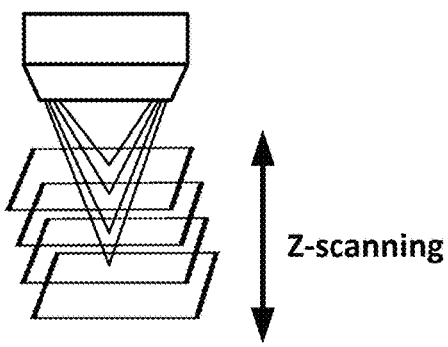
FIG. 3 is a schematic diagram illustrating an arrangement of multiplexed temporal focusing (MuST) spots for the 4× axial multiplexing and the 4× lateral multiplexing configuration of the 2p-MuST microscope.
Figure 3:
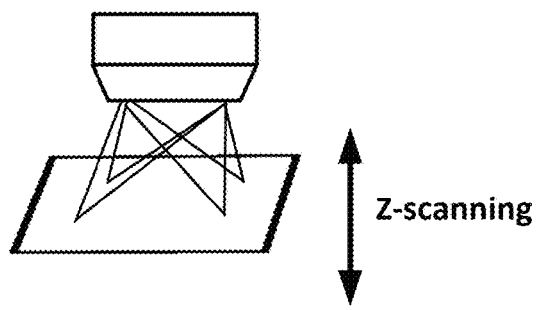

FIG. 3 illustrates an arrangement of multiplexed temporal focusing (MuST) spots for the 4× axial multiplexing and the 4× lateral multiplexing configuration of the 2p-MuST microscope. Using a small light-weight minor 12, rapid z-scanning (up to ~17 Hz) can be realized using the voice coil actuator 14. In the system of the present invention, a microscope is configured for a 4× axial or 4× lateral multiplexing scheme by designing different mirror holder chucks that were attached to the voice coil actuator. The design of the present invention is fully modular and as such it also allows to use any of the modules individually or in combination. For example, a remotely scanned temporal focusing module can be readily added to an existing 2p-scanning microscope. Overall, this design allowed for a voxel acquisition rate of 18.8 MHz covering up to 0.6 mm$^3$ in its different configurations.

Figure 4:
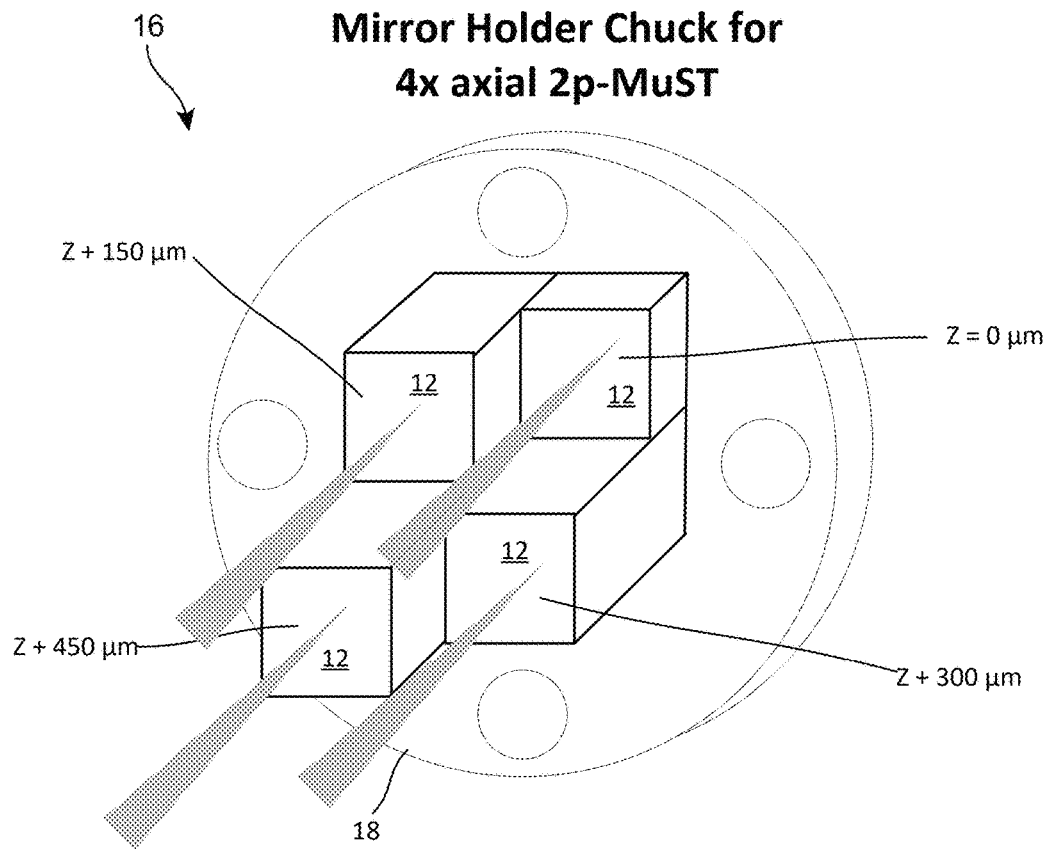
FIG. 4 is a perspective view of a minor holder chuck showing the beamlet arrangement for 4× axial multiplexing, according to the present invention.

For a 4× axial multiplexing configuration, it is desirable to record from a total axial range of ~600 µm. Thus, each of the four beamlets will cover an axial range of 150 µm in their respective sub-volumes in the sample. To achieve this, a specially designed mirror holder chuck 16 for the voice coil actuator 14 is provided, as shown in FIG. 4. The chuck 16 includes a base plate 18 for mounting to the voice coil actuator 14. The base plate 18 supports and allows for the positioning of four small minors 12 at different z-positions such that an axial separation of ~150 µm for the four beamlets could be achieved in the sample. Since the spots of the four beamlets on the mirrors 12 are laterally separated, the four sub-volumes in the sample also show a lateral displacement. By careful alignment of the beamlets, this lateral displacement of the sub-volumes can be minimized to less than ~95 µm.

As also shown in FIG. 3, it is further possible to configure the microscope for 4× lateral multiplexing. This is accomplished by aligning the four spatiotemporally multiplexed beamlets laterally using a different minor holder chuck on the voice coil actuator such that each beamlet covered laterally a quarter of the target FOV in the sample.

Figure 5:
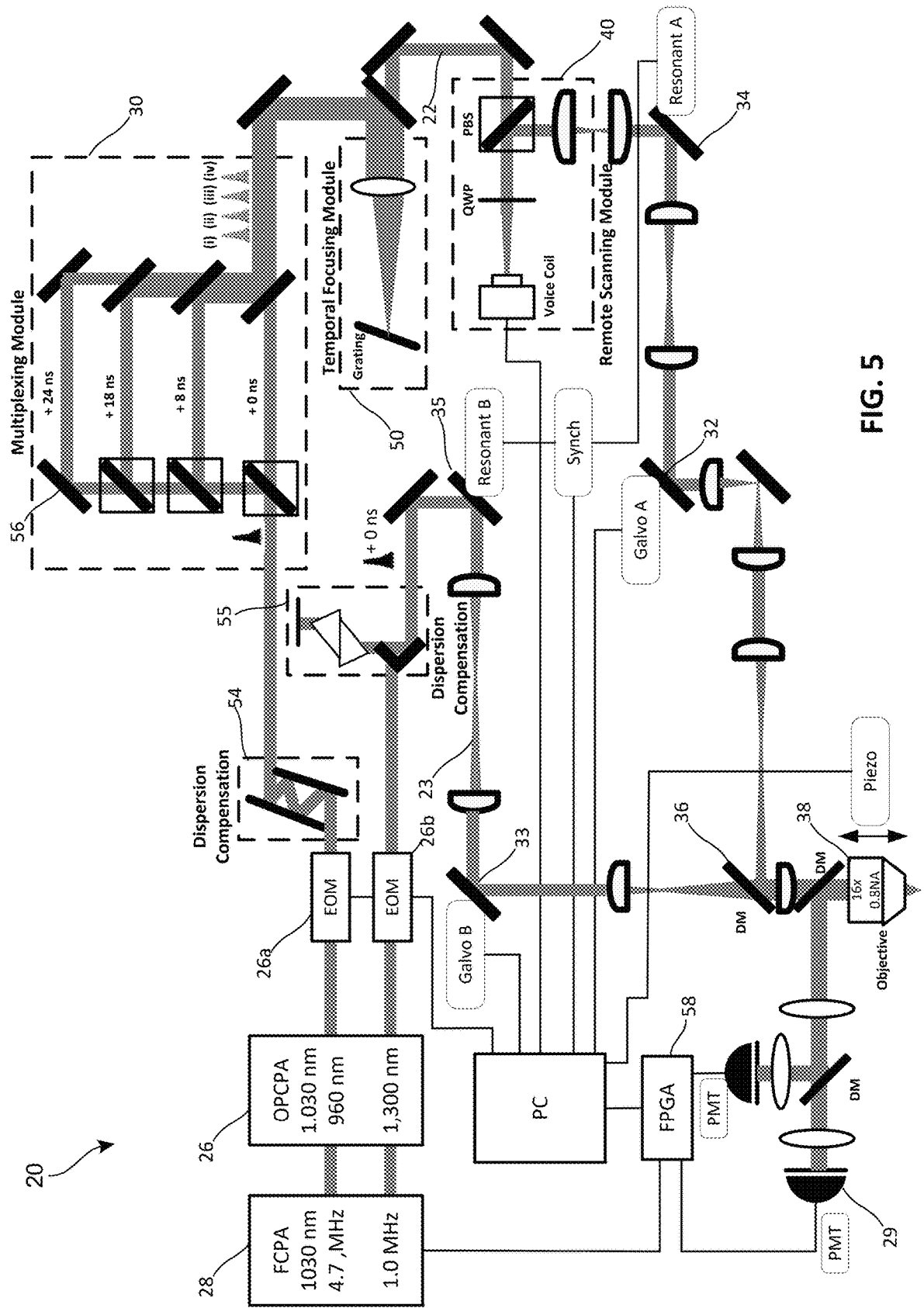
FIG. 5 is a schematic diagram showing the overall hybrid 3p/2p-MuST microscope and data acquisition system of the present invention.

FIG. 5 shows a hybrid multi-photon microscope system 20 according to the present invention. The system 20 combines a 2p-MuST optical path 22 with a 3p excitation path 23 into a multiphoton hybrid microscope. Expanding on the spatiotemporal multiplexing approach described above for 2p-MuST path 22, the present invention integrates the 3p excitation beam path 23 as the fifth beamlet, which can be delayed by ~8 ns with respect to the 2p beamlets. This is possible because of a specially designed laser system where both OPCPA channels 26 are pumped by the same FCPA laser 28, ensuring that the relative pulse delays are maintained. This synchronization of the pulse trains from the two OPCPA arms 26a, 26b allows the use of the same PMT and data acquisition pipeline 29 to detect the fluorescence signal from all five (four 2p-MuST and one 3p) excitation spots.

The system 20 preferably includes a custom laser system consisting of an Yb-fiber chirped pulse amplifier (FCPA) 28 and an optical parametric chirped pulse amplifier (OPCPA) 26. The OPCPA 26 has two output channels 26a, 26b at 960 nm and 1,300 nm wavelength for 2p and 3p excitation, respectively. The 960 nm channel 26a produces >0.8-µj, <90-fs pulses at a repetition rate of 4.7 MHz. The 1,300 nm channel 26b produces >1.4-µj, <70-fs pulses at a repetition rate of 1.0 MHz. Both channels are preferably dispersion compensated in respective dispersion compensation modules 54, 55 which may include custom chirped mirror pairs (960 nm channel) or a prism compressor (1,300 nm channel).

As discussed above, the 2p beam is split into four beamlets in the spatiotemporal multiplexing module 30. As is also shown in FIG. 1, the spatiotemporal multiplexing module 30 uses polarizing beam splitters (PBS) 56 with half-wave plates (HWPs) for power adjustment of each beamlet. With this arrangement, the beamlets can be delayed by 8, 16 and 24 ns, for example, using beam paths with relative length differences of ~2.5, ~5 and ~7.5 m, respectively. In a preferred embodiment, two additional HWPs are used whereby that the polarization can be adjusted such that all four beamlets are TE polarized. The beam diameters of each beamlet 10a, 10b, 10c, 10d are adjusted using individual telescopes, and the beams were then converged onto a plane that is conjugated to the temporal focusing module 50.

Figure 6:
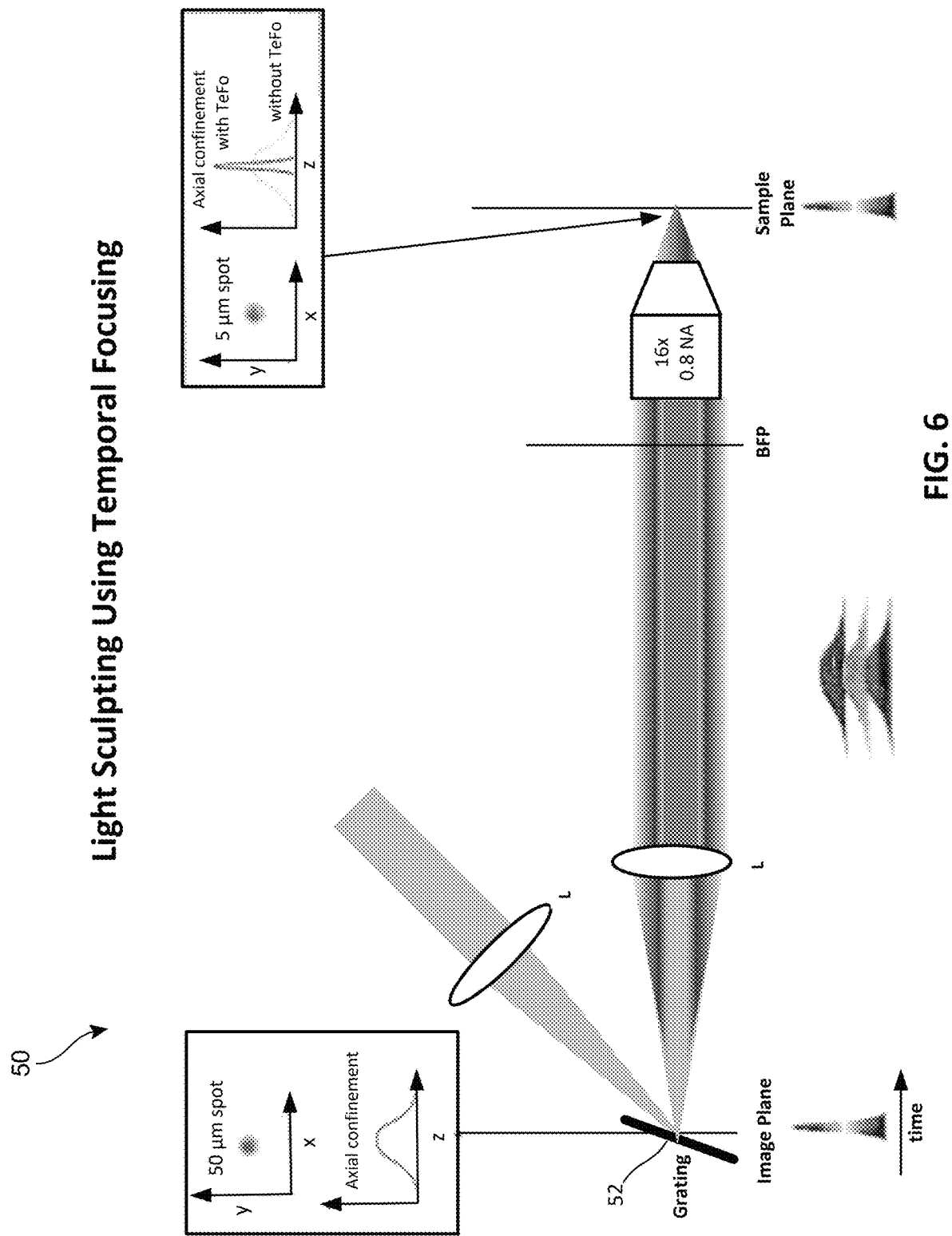
FIG. 6 is a schematic diagram illustrating light sculpting using a temporal focusing (TeFo) module according to the present invention.

Light sculpting of the 2p beam is preferably achieved with a temporal focusing (TeFo) module 50. As is also shown in FIG. 6, the spectrum of an ultrafast laser is spatially dispersed by a grating 52 and imaged into the sample plane. This arrangement results in a geometric dispersion of the pulse frequency components everywhere but in the focal plane within the sample, achieving an axial confinement of the excitation that can be controlled by the spectral filling of the microscope objective back focal plane (BFP). This allows an effective decoupling of the lateral confinement from the axial confinement of the excitation spot.

In a preferred embodiment, the temporal focusing module 50 includes a temporal focusing lens and a D-shaped minor. The four beamlets 10a, 10b, 10c, 10d are directed to the temporal focusing lens by the D-shaped mirror at a slight vertical angle. Preferably, the beamlets are then focused onto two small holographic diffraction gratings 52 arranged in a Littrow configuration. In this arrangement, the first diffraction order is spatially dispersed in the horizontal axis and collimated using the same lens before it is directed to the remote scanning module 40.

As described above, and also shown in FIG. 2, the remote scanning module 40 includes a polarizing beam splitter (PBS) 42, a quarter wave plate (QWP) 44 and a mirror (M) arrangement 12 mounted on a voice coil actuator (VC) 14. The four beamlets 10a, 10b. 10c, 10d pass through the PBS 42 and the QWP 44 before being focused by a remote scanning lens 58 (f=60 mm) onto the remote scanning mirror arrangement 12. As also described above, the minor arrangement 12 includes a mirror holder chuck 16 that supports four small (5×5×2 mm) mirrors 12a, 12b, 12c, 12d at respectively different axial positions along the beam path. Because of the different axial positions of the minors 12a, 12b, 12c, 12d, the beamlets 10a, 10b, 10c, 10d are directed to different positions in the sample. The minor holder chuck 16 is mounted on a fast voice coil actuator 14, which allows rapid remote scanning to continuously acquire volumes by saw-tooth axial z-scanning. The same lens 58 re-collimates the beamlets 10a, 10b, 10c, 10d and after the second pass through the QWP 44, the PBS 42 directs the beamlets to the microscope. In a preferred embodiment, a high-speed driver.

After passing through independent sets of galvo mirrors 32, 33 and resonant scanners 34, 35, which are preferably phase-locked to each other in a master/slave configuration, the 2p and 3p beam paths are combined using a dichroic mirror 36, while axial scanning in this case was performed using a microscope objective piezo 38. To ensure a high level of versatility of the hybrid multi-photon microscope 20, the remote scanning module 40, (as also shown in FIG. 2), preferably utilizes an adjustable mirror holder mount. The remote scanning module 40 enables free selection of the axial positions of the four 2p-MuST sub-volumes with respect to each other and with respect to the 3p volume which was kept at the native focal plane. This allows for the adjustment of the size and geometry of the imaged volume to regions of interest in the sample.

The microscope setup 38 preferably includes an identical galvo/resonant scanning (15.5 kHz) minor pair for both the two-photon and three-photon paths. The two resonant scanners 34, 35 are controlled in a phased-locked master/slave configuration. The scan and relay lenses are preferably chosen such that the 2p scanned temporal focusing spot on the grating is imaged into the sample exciting a volume of 5×5×15 µm and that the 3p spot excites a volume of 1.5×1.5×9.4 µm, respectively. The 960 nm and 1,300 nm channels are combined before the tube lens using a custom low-dispersion dichroic. In one aspect of the invention, a 0.8 NA, 16× water-immersion, long working distance microscope objective is used. The objective is preferably mounted on a long travel range (1 mm), high-speed piezo stage, which can be used for 3 photon and hybrid recordings to continuously acquire volumes by saw-tooth axial z-scanning of the microscope objective. The piezo uses a high-speed driver which allows for an optimized flyback and settling time of ~20 ms over a ~150-250 µm travel range. The resulting signal is collected using wide-angle optics, and detection is performed using a photon multiplier tube 29.

A data acquisition scheme, according to the present invention, is also shown in FIG. 5. The PMT signal is preferably recorded by an 800-MHz digitizer. A field programmable gate array (FPGA) 58 allows for synchronization of the voxel acquisition to the pulse repetition rate of the laser and to realize a scheme in which each voxel is excited only by a single laser pulse. The FPGA clock at 750 MHz is preferably provided by an evaluation board and phase-locked to the FCPA oscillator frequency. In a preferred embodiment, the FPGA digitizer board is triggered by individual laser pulses from the 960 nm channel at 4.7 MHz and the signal is collected from the PMT within 5 of the 1.33 ns samples. The line synchronization is provided by the master resonant scanner. Using a fast rise time (1 ns) PMT, it is possible to de-multiplex the fluorescent signals from subsequent beamlets at 8 ns spacing with negligible dynamic and static cross-talk. The laser intensity can be blanked during the turnaround of the resonant scanner and axial flyback time and modulated with increasing image depth.

Thus, the system of the present invention, as shown in FIG. 5 provides dispersion compensation, multiplexing, temporal focusing and remote focusing modules. The system defines a 2-photon path 22 and a 3-photon path 23. The data acquisition scheme preferably includes a phase-locked loop (PLL), an analog/digital converter (ADC) a photomultiplier tube (PMT) and a field programmable gate array (FPGA).

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The separation of various components in the examples described above should not be understood as requiring such separation in all examples, and it should be understood that the described components and systems can generally be integrated together in a single package, or into multiple systems.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the technology to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A multi-photon imaging system comprising:
a laser module including a pulse amplifier, the pulse amplifier outputting a two-photon excitation laser pulse and a three-photon excitation laser pulse, the laser module having a first output channel for guiding the two-photon excitation laser pulse in a first optical path and a second output channel for guiding the three-photon excitation laser pulse in a second optical path;
a telescope for receiving the two-photon excitation laser pulse from the first optical path and the three-photon excitation laser pulse from the second optical path, and delivering the two-photon excitation laser pulse and the three-photon excitation pulse to a target volume; and
a detector configured to collect photons generated within the target volume in response to excitation of the target volume by both the two-photon excitation laser pulse and the three-photon excitation laser pulse.

2. The multi-photon imaging system as defined in claim 1, further comprising a multiplexing module configured to split the two-photon excitation laser pulse received from the laser module into a plurality of sub-pulses including a first sub-pulse and a second sub-pulse and to introduce a time delay between the first sub-pulse and the second sub-pulse.

3. The multi-photon imaging system as defined in claim 1, further comprising a temporal focusing for spatially dispersing a spectrum of at least one of the two-photon excitation laser pulse or the three-photon excitation laser pulse.

4. The multi-photon imaging system as defined in claim 1, further comprising a remote scanning module including one or more of a polarizing beam splitter, a quarter wave plate and at least one mirror movable in an axial direction of the first optical path or the second optical path for axially scanning the two-photon excitation laser pulse between different depths within the target volume.

5. The multi-photon imaging system as defined in claim 4, further comprising an actuator for moving the at least one mirror in a direction of the received two-photon excitation laser pulse and the received three-photon excitation laser pulse for axially scanning the two-photon laser pulse and the three-photon laser pulse between different depths within the target volume.

6. The multi-photon imaging system as defined in claim 1, further comprising a dichroic mirror for combining the first optical path and the second optical path.

7. The multi-photon imaging system as defined in claim 1, wherein the telescope includes two resonant scanners for both the two-photon excitation laser pulse and the three-photon excitation laser pulse.

8. The multi-photon imaging system as defined in claim 7, wherein the two resonant scanners are controlled in a phased-locked master-slave configuration.

9. The multi-photon imaging system as defined in claim 1, wherein the detector is a photon multiplier tube.

10. The multi-photon imaging system as defined in claim 1, wherein the telescope includes an identical pair of mirrors for both the first optical path and the second optical path.

11. An imaging system comprising:
a laser module for outputting a laser pulse, the laser module including a first pulse amplifier and a second pulse amplifier;
a multiplexing module configured to split the laser pulse received from the laser module into a plurality of sub-pulses including at least a first sub-pulse and a second sub-pulse and to introduce a time delay between the first sub-pulse and the second sub-pulse;
a temporal focusing module for geometrically dispersing one or more pulse frequency components of the first sub-pulse and the second sub-pulse;
a remote scanning module for receiving the first sub-pulse and the second sub-pulse and including a mirror movable in an axial direction of the first sub-pulse and the second sub-pulse for axially scanning the first sub-pulse and the second sub-pulse between different depths within a target volume;
a telescope for receiving the first sub-pulse and the second sub-pulse from the remote scanning module and delivering the first sub-pulse and the second sub-pulse to a target volume; and
a detector configured to collect photons generated within the target volume in response to excitation of the target volume by both the first sub-pulse and the second sub-pulse.

12. The imaging system as defined in claim 11, further comprising a lateral scanning module for respectively angularly deflecting the first sub-pulse and the second sub-pulse, whereby the first sub-pulse and the second sub-pulse are respectively scanned on first and second axial planes within the target volume.

13. A method for multi-photon imaging of fluorophores within a target volume, the method comprising:
generating a two-photon laser pulse from a first pulse amplifier of a laser module;
generating a three-photon laser pulse from the first pulse amplifier of the laser module;
guiding the two-photon laser pulse from the laser module along a first optical path via a second pulse amplifier;
guiding the three-photon laser pulse from the laser module along a second optical path via the second pulse amplifier;
delivering the two-photon laser pulse from the first optical path and the three-photon laser pulse from the second optical path to a telescope, the telescope including a first mirror and a second mirror, the first mirror for receiving two-photon laser pulse from the first optical path and the second mirror for receiving the three-photon laser pulse from the second optical path;
combining the two-photon laser pulse and the three-photon laser pulse from the telescope;
delivering the combined two-photon laser pulse and three-photon laser pulse to a target volume; and
collecting photons generated within the target volume in response to simultaneous excitation of the target volume by both the two-photon laser pulse and the three-photon laser pulse with a photodetector.

14. The method as defined in claim 13, further comprising:
splitting the two-photon laser pulse into a plurality of sub-pulses including a first sub-pulse and a second sub-pulse;
introducing a time delay between the first sub-pulse entering the target volume and the second sub-pulse entering the target volume.

15. The method as defined in claim 13, further comprising spatially dispersing a spectrum of the two-photon laser pulse.

16. The method as defined in claim 13, further comprising axially scanning the two-photon laser pulse between different depths within the target volume.

17. The method as defined in claim 13, further comprising axially scanning the two-photon laser pulse and the three-photon laser pulse between different depths within the target volume.

18. The method as defined in claim 13, further comprising temporally focusing the two-photon laser pulse onto a diffraction grating.

19. A method for high-speed imaging of fluorophores within a target volume, the method comprising:
   generating a pulsed laser beam from pulse amplifier of a laser module;
   splitting the pulsed laser beam from the laser module into a plurality of sub-pulses via one or more beam splitters; the plurality of sub-pulses including a first sub-pulse and a second sub-pulse;
   introducing a time delay between the first sub-pulse and the second sub-pulse by using beam paths having relative length differences;
   spatially dispersing a spectrum of the first sub-pulse and the second sub-pulse;
   axially scanning the first sub-pulse and the second sub-pulse between different depths;
   delivering the first sub-pulse and the second sub-pulse to the target volume; and
   detecting photons generated within the target volume in response to simultaneous excitation of the target volume by both the first sub-pulse and the second sub-pulse.

20. The method as defined in claim 19, further comprising respectively angularly deflecting the first sub-pulse and the second sub-pulse, whereby the first sub-pulse and the second sub-pulse are respectively scanned on first and second axial planes within the target volume.

* * * * *